United States Patent
Lee

(10) Patent No.: US 9,592,798 B2
(45) Date of Patent: Mar. 14, 2017

(54) BRAKING SYSTEM AND BRAKING CONTROL METHOD IN PARKING

(71) Applicant: MANDO CORPORATION, Pyeongtaek-si (KR)

(72) Inventor: Chan Won Lee, Anyang-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/723,455

(22) Filed: May 28, 2015

(65) Prior Publication Data

US 2015/0344007 A1 Dec. 3, 2015

(30) Foreign Application Priority Data

May 30, 2014 (KR) .................. 10-2014-0065743

(51) Int. Cl.

| | |
|---|---|
| *B60T 7/12* | (2006.01) |
| *B60T 8/171* | (2006.01) |
| *B60T 13/58* | (2006.01) |
| *B60T 13/66* | (2006.01) |
| *B60T 13/68* | (2006.01) |
| *B60T 13/74* | (2006.01) |

(52) U.S. Cl.
CPC .............. *B60T 7/12* (2013.01); *B60T 8/171* (2013.01); *B60T 13/588* (2013.01); *B60T 13/662* (2013.01); *B60T 13/686* (2013.01); *B60T 13/741* (2013.01); *B60T 2201/06* (2013.01)

(58) Field of Classification Search
CPC ... B60T 7/12; B60T 8/171; B60T 8/24; B60T 8/245; B60T 8/32; B60T 8/3205; B60T 8/3255; B60T 8/326
See application file for complete search history.

(56) References Cited

U.S. PATENT DOCUMENTS

| | | | | |
|---|---|---|---|---|
| 6,450,587 | B1 * | 9/2002 | MacGregor | B60T 7/10 303/89 |
| 2004/0124697 | A1 * | 7/2004 | MacGregor | B60T 17/18 303/89 |
| 2007/0029876 | A1 * | 2/2007 | Makishima | B60T 13/74 303/191 |
| 2007/0158999 | A1 * | 7/2007 | Leboisne | B60T 13/52 303/3 |
| 2008/0149437 | A1 * | 6/2008 | Herges | B60T 7/12 188/138 |
| 2010/0016123 | A1 * | 1/2010 | Kodaka | B60T 7/085 477/186 |

(Continued)

FOREIGN PATENT DOCUMENTS

KR 10-2010-0030012 3/2010

*Primary Examiner* — Adam Tissot
*Assistant Examiner* — Tamara Weber
(74) *Attorney, Agent, or Firm* — Ladas & Parry LLP

(57) ABSTRACT

Disclosed herein is a brake system including a main brake applying braking force to a wheel of a vehicle when the vehicle travels, a parking brake applying braking force to the wheel of the vehicle when the vehicle is parked, and a parking brake controller operating the main brake when the parked vehicle is sensed to move above a predetermined reference value and stopping the operation of the main brake after increasing locking force of the parking brake when the movement of the vehicle is stopped according to the operation of the main brake.

15 Claims, 6 Drawing Sheets

(56) References Cited

U.S. PATENT DOCUMENTS

| | | | | |
|---|---|---|---|---|
| 2010/0051395 | A1* | 3/2010 | Sano | B60T 1/005 188/162 |
| 2013/0175124 | A1* | 7/2013 | Tomczak | B60T 13/588 188/106 F |
| 2014/0015310 | A1* | 1/2014 | Hanzawa | B60T 7/12 303/3 |
| 2014/0202801 | A1* | 7/2014 | Berger | B60T 13/588 188/106 P |

* cited by examiner

BRAKING SYSTEM AND BRAKING CONTROL METHOD IN PARKING

CROSS-REFERENCE TO RELATED APPLICATION

This application claims the benefit of Korean Patent Application No. 10-2014-0065743, filed on May 30, 2014 in the Korean Intellectual Property Office, the disclosure of which is incorporated in its entirety herein by reference.

BACKGROUND OF THE INVENTION

Field of the Invention

Exemplary embodiments of the present invention relate to a brake control method for parking, capable of enhancing braking safety when a vehicle is parked, and a brake system for performing the same.

Description of the Related Art

In general, a driver locks a parking brake separately provided from a main brake of a vehicle when parking or stopping the vehicle such that the parking brake is operated, with the consequence that the vehicle is safely stopped. Thus, the vehicle may be safely maintained in the stopped state even when the vehicle is parked on a slope as well as a flat road.

However, when the driver parks the vehicle on the slope, the conventional parking brake may not be enough to ensure safety of the vehicle. For this reason, the vehicle may slide due to various undesired factors such as external impact when the driver is absent in the vehicle in a state in which the parking brake is unstably locked, resulting in unfortunate accidents.

Accordingly, there is a need to efficiently maintain a state in which the vehicle is stopped, in order to resolve a dangerous situation in which the parked vehicle slides.

In addition, when the driver gets off the vehicle on a relatively gentle slope in a state in which the parking brake is not sufficiently locked due to his/her carelessness, accidents may happen by movement of the vehicle.

RELATED ART DOCUMENT

Patent Document (Patent Document 1) Korean Patent Laid-open Publication No. 2010-0030012

SUMMARY OF THE INVENTION

An object of the present invention is to provide a brake system capable of sufficiently applying braking force of a parking brake to a vehicle parked in a state in which the braking force is not sufficiently applied thereto.

Another object of the present invention is to provide a brake system capable of preventing sliding of a vehicle parked in a state in which a parking brake is not sufficiently locked due to driver's carelessness.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a brake system includes a main brake applying braking force to a wheel of a vehicle when the vehicle travels, a parking brake applying braking force to the wheel of the vehicle when the vehicle is parked, and a parking brake controller operating the main brake when the parked vehicle is sensed to move above a predetermined reference value and stopping the operation of the main brake after increasing locking force of the parking brake when the movement of the vehicle is stopped according to the operation of the main brake.

The parking brake controller may integrally control the main brake and the parking brake through one module.

The parking brake may be an electromechanical brake which increases the locking force of the parking brake by decelerating through a gear and generating the braking force of the vehicle.

In accordance with another aspect of the present invention, a brake control method for parking, includes identifying a locked state of a parking brake or a parked state of a vehicle, monitoring movement of the vehicle, operating a main brake when the vehicle is sensed to move above a predetermined reference value, increasing locking force of the parking brake when the movement of the vehicle is stopped according to the operation of the main brake, and stopping the operation of the main brake.

The operating a main brake may be performed through an active safety device for controlling the main brake.

The increasing locking force of the parking brake may be performed in a manner of increasing a value of current supplied to a brake motor provided in the parking brake.

The monitoring movement of the vehicle may determine the movement of the vehicle from a value sensed by a vehicle speed sensor installed to the vehicle.

The monitoring movement of the vehicle may determine the movement of the vehicle from a value sensed by a gyro sensor or an acceleration sensor.

The brake control method may further include, after the increasing locking force of the parking brake, determining an inclination of the parked vehicle, warning, when the inclination exceeds a predetermined reference value, a driver about the same, and receiving an instruction to stop the operation of the main brake from a driver or stopping the operation of the main brake after elapse of a predetermined reference time after the warning.

The parking brake and the main brake may be integrally controlled by a parking brake controller.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
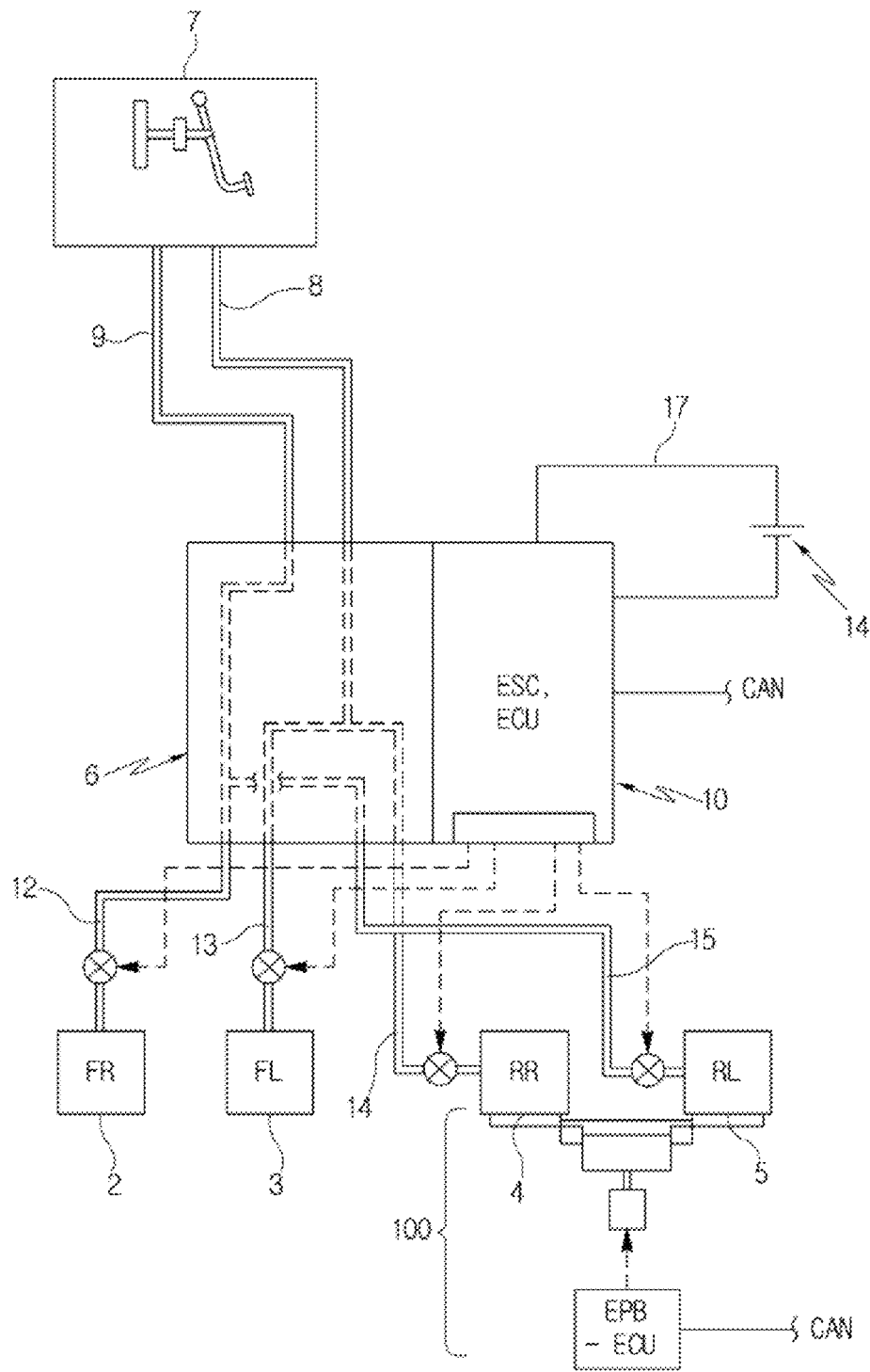
FIG. 1 is a block diagram illustrating a brake system for parking brake control according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is a block diagram illustrating a brake system for parking brake control according to an embodiment of the present invention.

The brake system illustrated in the drawing may include a main brake for applying braking force to wheels of a vehicle when the vehicle travels, a parking brake 100 for applying braking force to the wheels of the vehicle when the vehicle is parked, and a parking brake controller which operates the main brake when the parked vehicle is sensed to move above a predetermined reference value and stops the operation of the main brake after increasing locking force of the parking brake when the movement of the vehicle is stopped according to the operation of the main brake.

The main brake illustrated in the drawing may include a hydraulic control assembly 6 having a hydraulic control unit, a plurality of brake calipers 2 to 5 which is hydraulically connected to the hydraulic control assembly 6 and has hydraulic actuators configured in a plurality of hydraulic brake circuits, first hydraulic lines which connect the hydraulic control assembly 6 to the calipers 2 to 5, and second hydraulic lines 8 and 9 which connect the hydraulic control assembly 6 to a brake pedal 7.

The hydraulic control assembly 6 may include a motor-pump assembly (or engine power-pump assembly) for provision of hydraulic energy and electron-hydraulic valves.

In the structure illustrated in the drawing, the hydraulic actuators may be operated via the first hydraulic lines and the second hydraulic lines 8 and 9 by the brake pedal 7. The hydraulic control assembly 6 illustrated in the drawing allows electronic control brake torque distribution (EBD) to the brake calipers 2 to 5 to be basically available from the connection structure thereof.

Meanwhile, the brake calipers 2 to 5 may be operated by an ESC (Electronic Stability Control), regardless of a driver's intention. To this end, the brake system may include valves V2 to V4 which are controlled by the ESC and control hydraulic pressures to the first hydraulic lines. When the valves V2 to V4 are opened by the ESC, the brake calipers 2 to 5 may be operated so as to provide braking force required for each wheel of the vehicle. In this case, the hydraulic pressures applied to the brake calipers 2 to 5 may be hydraulic pressures accumulated in the hydraulic lines when the vehicle travels or be obtained through the operation of a brake pressure auxiliary device such as a vacuum booster or a vacuum pump.

The parking brake 100 illustrated in the drawing may additionally include electromechanical actuator units for operating at least portions 4 and 5 of the brake calipers 2 to 5, in order to operate the parking brake or release the operation thereof based on request for locking of the parking brake.

The electromechanical actuator units of the parking brake 100 may be provided together with a disc brake or act on a drum brake. The actuator units are preferably arranged on a rear axle.

According to the embodiment, the parking brake 100 may be an EPB (Electronic Parking Brake). The EPB is an automatic parking brake system which is electronically controlled. In the automatic parking brake system, a computer determines vehicle speed and whether or not an engine is driven and a brake is operated, so that braking is automatically performed when the driver steps on a brake pedal for stopping of the vehicle and the braking is automatically released when the driver steps on an accelerator pedal for traveling of the vehicle. The EPB includes a cable puller type brake, a motor on caliper type brake, a hydraulic parking brake, etc.

According to the embodiment, the parking brake controller may be an ECU of the parking brake 100, an ECU of the ESC 10, a separate ECU, or a functional module array for serving as the ECU of the parking brake 100 and the ECU of the ESC 10 together.

For example, when the parking brake 100 is a cable puller type brake, the parking brake controller may be an ECU of the ESC 10 which is one of active safety devices of the vehicle or a separate ECU. In addition, when the parking brake 100 is a motor on caliper type brake, the parking brake controller may be an ECU of the parking brake 100 or a separate ECU.

Figure 2:
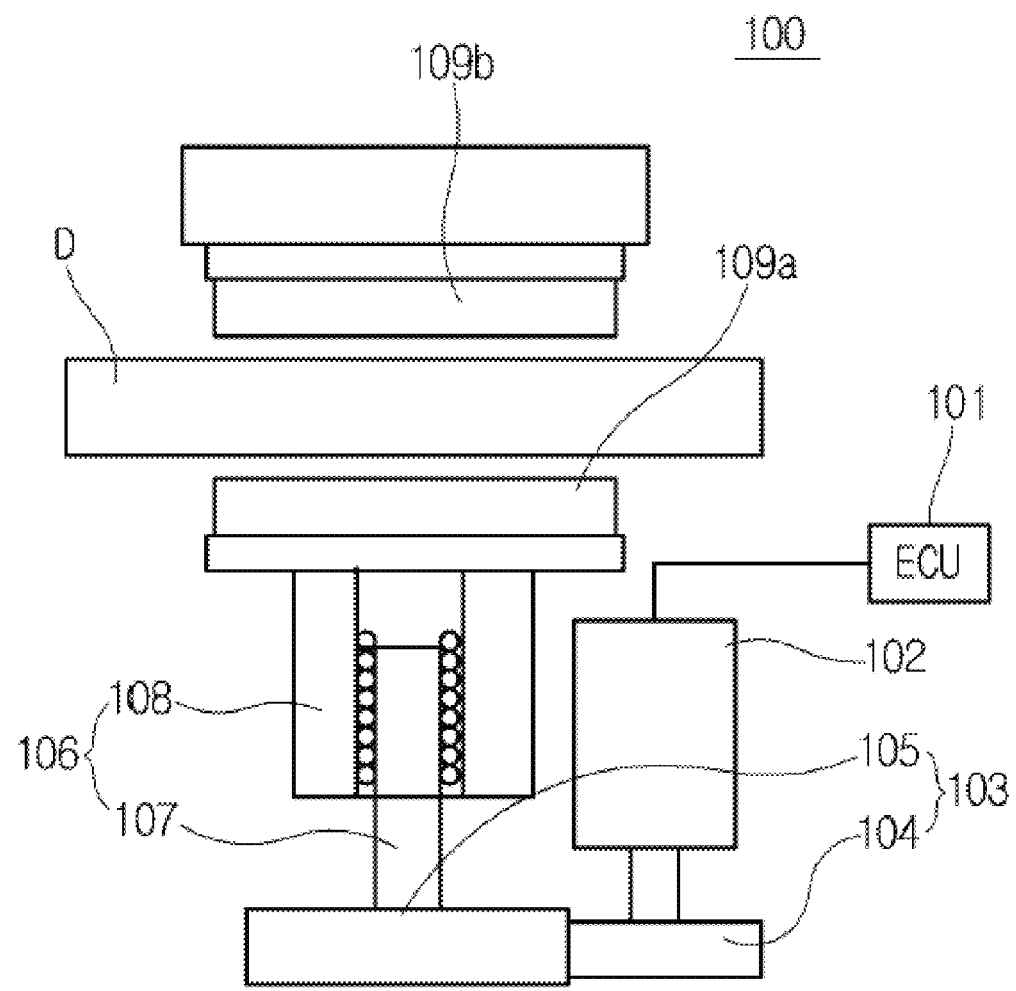
FIG. 2 is a view illustrating a configuration of an electric parking brake having a parking brake function using gears, which is applicable to a parking brake in FIG. 1.

FIG. 2 is a view illustrating a configuration of an electric parking brake having a parking brake function using gears, which is applicable to the parking brake 100 in FIG. 1.

The electric parking brake illustrated in the drawing includes an ECU 101 which grasps a vehicle traveling state and generates control signals through signals input from an electronic pedal, an actuator 102 which generates power by the control of the ECU 101, a reducer 103 which is rotated by the power of the actuator 102, and a spindle 106 which axially moves pads 109a and 109b toward a wheel disc D using the rotational force of the reducer 103. To this end, the ECU 101 realizes control required for braking by receiving information on a stepped amount of the operated electronic pedal, vehicle posture information through a yaw moment sensor mounted to the vehicle, and the like. In an alternative example, the electric parking brake may have an ECU different from the ECU 101.

In addition, the actuator 102 may be a motor. The reducer 103 is configured by first and second gears 104 and 105 which rotatably engage with each other. The first gear 104 is fixed to the actuator 102 and rotated along therewith, and the second gear 105 rotates the spindle 106.

In addition, the spindle 106 may include a screw shaft 107 to which the second gear 105 constituting the reducer 103 is fixed so as to be rotated along therewith and a screw nut 108 which is axially moved according to the rotation of the screw shaft 107.

The electric parking brake has a structure of generating braking force of the vehicle by decelerating through the first and second gears 104 and 105 and generating friction force between the brake pads and the brake disc through the spindle 106 connected to the gears for axially moving the pads.

Figure 3:
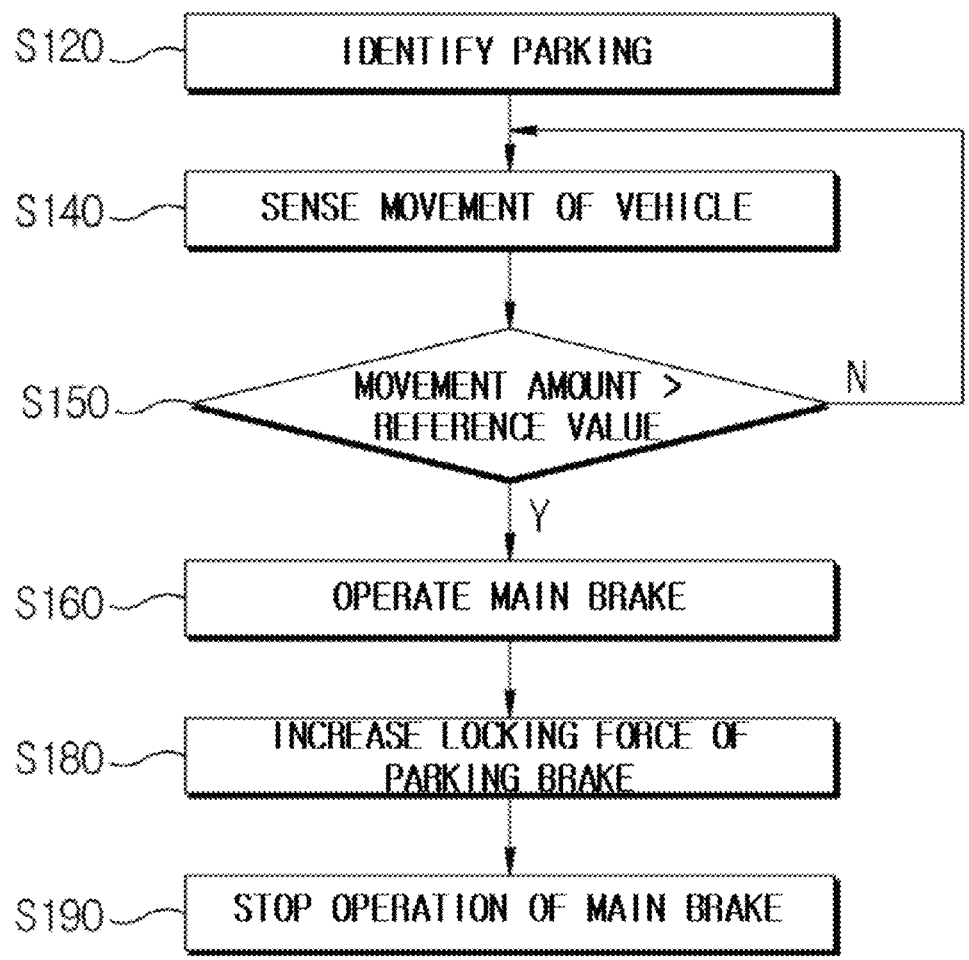
FIG. 3 is a flowchart illustrating a brake control method for parking according to an embodiment of the present invention.

FIG. 3 is a flowchart illustrating a brake control method for parking according to an embodiment of the present invention. The brake control method for parking illustrated in the drawing may include a step S120 of identifying a locked state of a parking brake or a parked state of a vehicle, a step S140 of monitoring movement of the vehicle, a step S160 of operating a main brake when the vehicle is sensed to move above a predetermined reference value S150, a step S180 of increasing locking force of the parking brake when the movement of the vehicle is stopped according to the operation of the main brake, and a step S190 of stopping the operation of the main brake.

The step S120 may be performed using various driver operation devices installed to the vehicle. For example, the vehicle may be identified to be parked when the traveling vehicle is stopped and stalled in the step S120. In addition, the vehicle may be identified to be parked when an automatic gearshift is in a parking range in the step S120.

The step S140 may be performed using a vehicle speed sensor or a gyro (acceleration) sensor installed to the vehicle. The vehicle speed sensor may accurately sense movement of the vehicle on a relatively gentle slope and the acceleration (gyro) sensor may rapidly sense movement of the vehicle on a relatively steep slope. Therefore, it is preferable to use the two sensors together.

In the step S150, the reference value may be a magnitude of only a movement amount or be a relevant value of a movement amount and a time. For example, when the movement is accelerated in proportion to an increase in time, the process may be realized such that the step S160 is performed.

In the step S160 of operating the main brake, the main brake installed to the vehicle is operated. In the step S160, a hydraulic brake may be operated so that brake drums and brake pads come into close contact with each other when the vehicle is a motor vehicle, and a main brake motor may be operated so that brake drums and brake pads come into close contact with each other when the vehicle is an electric vehicle.

Meanwhile, in a vehicle having a hydraulic brake and an active safety device (for instance, ABS (Anti-lock Brake System), ESC (Electronic Stability Control), TCS (Traction Control System), or VDC (Vehicle Dynamics Control)), the active safety device performs a predetermined active safety operation by controlling valves located on hydraulic lines of the hydraulic brake.

In the vehicle having the hydraulic brake and the active safety device, the step S160 may be performed by controlling the valves located on the hydraulic lines of the hydraulic brake. In this case, the valves may be controlled by separate control signals and control signal lines or may be controlled through (by) the active safety device.

When the active safety device has a multiple function such as a sliding prevention function on the slope, the steps S140 to S160 may be performed by the active safety device. For example, the process may be realized in a manner in which the active safety device is continuously operated even when the vehicle is identified to be parked S120, and is then stopped in the step S190 after the step S180 is performed.

In the step S180, the locking force of the parking brake may be enhanced by increasing a value of current supplied to a brake motor included therein. Alternatively, the locking force may be enhanced by increasing a value of voltage supplied to the motor, increasing a operating time of the motor, or shifting a gear connected to a drive shaft of the motor, according to a types of the motor.

Since the main brake is not typically operated when the vehicle is parked, the step S190 may be performed without special action on the main brake. In this case, the valves located on the hydraulic lines may be closed.

Figure 4:
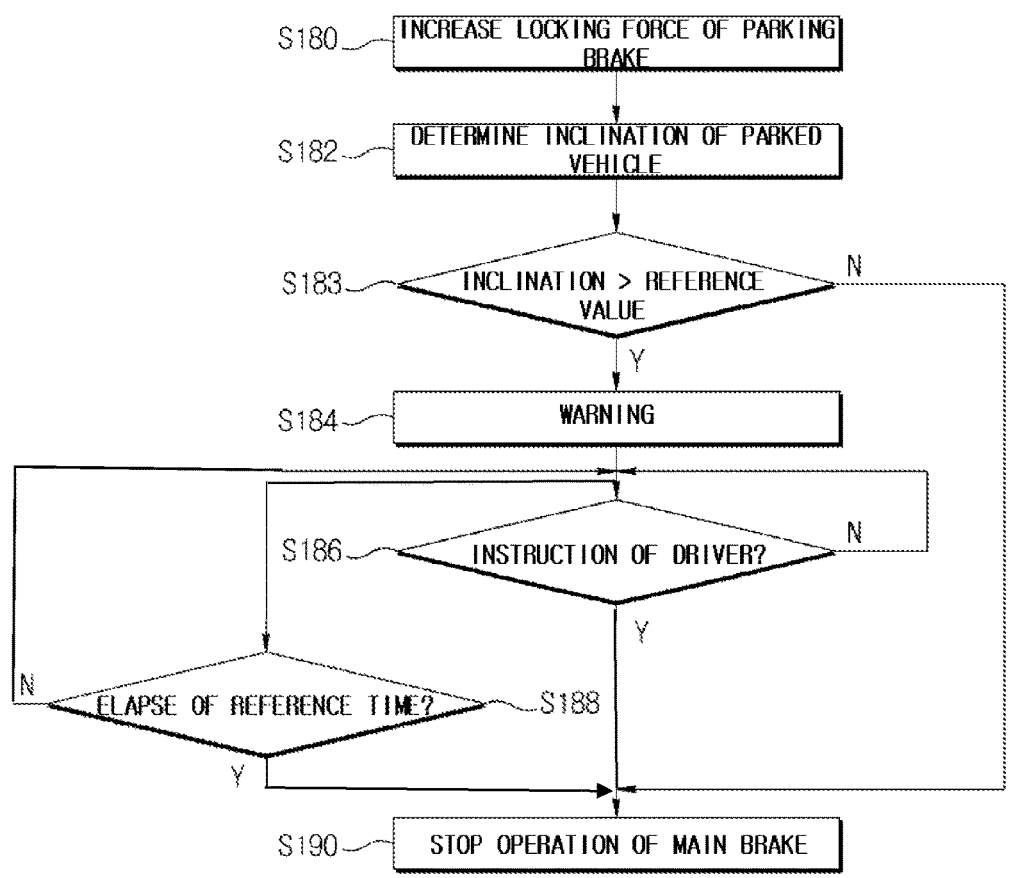
FIG. 4 is a flowchart illustrating steps added to FIG. 3 according to another embodiment of the present invention.

Meanwhile, when the vehicle is parked on a very steep slope, it may be difficult to ensure safety by only the parking brake or a possibility of the parking brake being damaged may be increased. In this case, after the step S180, the brake control method may include a step S182 of determining an inclination of the parked vehicle before the operation of the main brake is stopped in the step S190, a step S184 of warning a driver that the inclination exceeds a predetermined reference value, and a step S186 of receiving an instruction to stop the operation of the main brake from the driver or the step S190 of stopping the operation of the main brake after the elapse of a predetermined reference time S188 after the warning, as illustrating in FIG. 4.

Since the step S182 determines the inclination of the stopped vehicle, it may be possible to be simply realized using the gyro sensor or the acceleration sensor.

The step S184 is a warning step in which the driver prepares for sliding of the vehicle on the slope by applying a parking support to the wheel of the vehicle or by significantly turning the wheel. The driver may take the relevant action and then instruct the operation stop of the main brake in the step S186.

Figure 5:
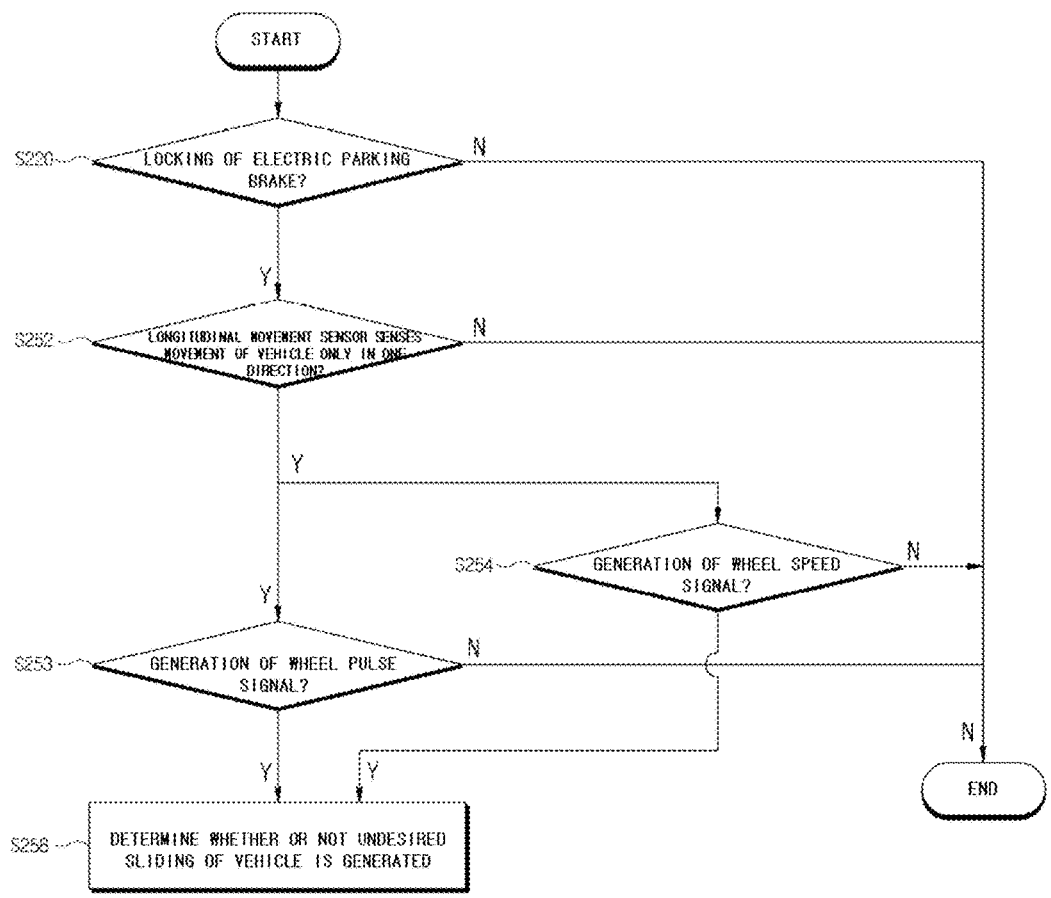
FIG. 5 is a flowchart illustrating a brake control method for parking according to another embodiment of the present invention.

FIG. 5 is a flowchart illustrating a brake control method for parking according to another embodiment of the present invention. Particularly, FIG. 5 specifically illustrates a process of identifying the movement of the vehicle in the steps S140 and S150 in FIG. 3, namely, of identifying whether or not the sliding of the vehicle by the inclination is generated. The operations in the flowchart of FIG. 5 may be performed by an electric parking brake controller.

The brake control method for parking illustrated in the drawing may include a step S220 of identifying whether or not an electric parking brake is locked, a step S252 of identifying whether or not a vehicle moves only in one direction using a longitudinal movement sensor, a step S253 of identifying whether or not a wheel pulse signal is generated, a step S254 of identifying whether or not a wheel speed signal is generated, and a step S258 of determining whether or not undesired movement of the vehicle, namely, sliding is generated.

The start step and step S220 illustrated in FIG. 5 may refer to the step S120 in FIG. 3, and the steps S252 to S258 may refer to the steps S140 and S150 in FIG. 3. The end step means that the brake control method according to the embodiment of the present invention is ended instead of being performed since the sliding of the vehicle is not generated.

The step S252 primarily determines whether or not undesired movement, namely, sliding of the vehicle is generated through a value sensed by the longitudinal movement sensor. When the vehicle moves forward and backward instead of sliding due to other factors, the vehicle is sensed to be moved in both longitudinal directions. Therefore, in this case, the brake control method according to the embodiment of the present invention is not performed.

The steps S253 and S254 are steps of identifying whether or not the sliding of the vehicle is generated using other sensor units, in addition to the primary determination result in the step S252. The step S253 identifies whether or not the sliding of the vehicle is generated using a wheel pulse signal, and the step S254 identifies whether or not the sliding of the vehicle is generated using a wheel speed signal.

According to the embodiment, one of the steps S253 and S254 may be used to identify the generation of the sliding or both may be used to identify the generation of the sliding. In the latter case, the sliding may be finally determined to be generated when both of a change in wheel pulse signal in the step S253 and a change in wheel speed signal in the step S254 are generated, or the sliding may be finally determined to be generated when one of the change in wheel pulse signal in the step S253 and the change in wheel speed signal in the step S254 is generated.

Figure 6:
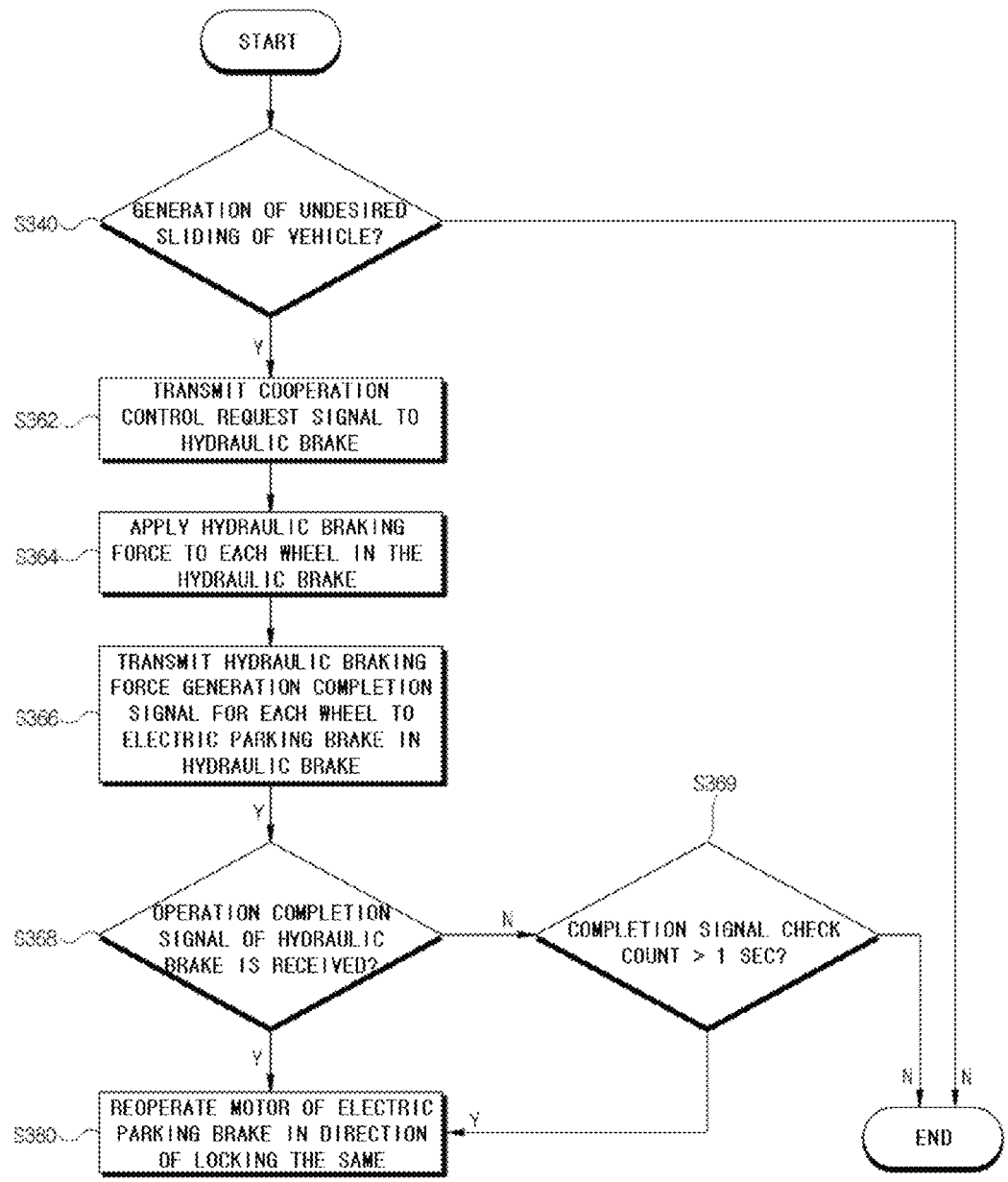
FIG. 6 is a flowchart illustrating a brake control method for parking according to a further embodiment of the present invention.

FIG. 6 is a flowchart illustrating a brake control method for parking according to a further embodiment of the present invention. Particularly, FIG. 6 specifically illustrates the steps S160 and S180 in FIG. 3 when the main brake is a hydraulic brake. In the flowchart of FIG. 6, the brake control method for parking according to the embodiment of the present invention may be performed by an electric parking brake controller.

The brake control method for parking illustrated in the drawing may include a step S340 of recognizing undesired movement (namely, sliding) of a vehicle, a step S362 of transmitting a braking request signal (namely, a cooperation control request signal) to the hydraulic brake, a step S364 of applying hydraulic braking force to each wheel in the hydraulic brake, a step S366 of informing an electric parking brake controller that the application of the hydraulic braking force to the wheel is completed in the hydraulic brake, a step S368 of identifying whether or not the operation of the hydraulic brake is completed in the electric parking brake controller, and a step S380 of identifying that the operation of the hydraulic brake is completed or of reoperating the electric parking brake in a direction of locking the same after the elapse of a predetermined reference time S369.

The start step illustrated in FIG. 6 may refer to the step S120 in FIG. 3, and the step S380 may refer to the step S180 in FIG. 3. The end step may mean that the brake control method according to the embodiment of the present invention is postponed instead of being performed.

The step S340 may be realized so as to include the steps S252 to S258 illustrated in FIG. 5.

The step S362 may be performed in a manner of transmitting a cooperation control request signal according to a predetermined regulation to the hydraulic brake in the electric parking brake controller.

The step S364 may be performed in a manner of similar to the braking operation of the typical hydraulic brake, but differs from that in the typical method in that braking is performed in a state in which a driver operation does not intervene therein.

The step S366 may be performed in a manner of transmitting a hydraulic braking force generation completion signal for each wheel to the electric parking brake controller in the hydraulic brake.

The step S368 is a step of identifying whether or not the braking operation of the hydraulic brake is completed by the electric parking brake controller, and may be performed in a manner of receiving a hydraulic braking operation completion signal according to a predetermined regulation.

The step S369 is a step of reoperating the electric parking brake in a direction of locking the same after the elapse of a predetermined reference time even though the braking operation completion signal in the step S368 is not received. Although devices may be damaged when the electric parking brake is reoperated before the braking by the hydraulic brake is not completed, the electric parking brake is preferably reoperated after the elapse of a predetermined time (for instance, 1 sec in the drawing) for safety even though the hydraulic braking completion is not identified. Here, the reference point of time when the predetermined time begins to be counted may be a point of time when the cooperation control request signal in the step S362 is transmitted.

Meanwhile, the parking brake and the main brake may be integrally controlled by the parking brake controller.

In addition, although not separately described in the embodiments, the brake control method according the embodiments may be applied when the vehicle is stopped.

As is apparent from the above description, a brake system according to exemplary embodiments of the present invention can sufficiently apply braking force of a parking brake to a vehicle parked in a state in which the braking force is not sufficiently applied thereto.

In addition, the brake system can prevent sliding of the vehicle parked in a state in which the parking brake is not sufficiently locked due to driver's carelessness.

While the present invention has been described with respect to the specific embodiments, it will be apparent to those skilled in the art that various changes and modifications may be made without departing from the spirit and scope of the invention as defined in the following claims.

What is claimed is:
1. A brake system comprising:
a main brake applying braking force to a wheel of a vehicle when the vehicle travels;
a parking brake applying braking force to the wheel of the vehicle when the vehicle is parked; and
a parking brake controller configured to operate the main brake when the parked vehicle is sensed to move above a predetermined reference value and stop the operation of the main brake after increasing locking force of the parking brake when the movement of the vehicle is stopped according to the operation of the main brake,
wherein the parking brake controller is configured to determine an inclination of the parked vehicle; warn, when the inclination exceeds a predetermined reference value, a driver about the same; and receive an instruction to stop the operation of the main brake from a driver or stopping the operation of the main brake after elapse of a predetermined reference time after the warning.
2. The brake system according to claim 1, wherein the parking brake controller is configured to integrally control the main brake and the parking brake.
3. The brake system according to claim 1, wherein the parking brake is an electromechanical brake which increases the locking force of the parking brake by decelerating through a gear and generating the braking force of the vehicle.
4. A brake control method for parking, comprising:
identifying a locked state of a parking brake or a parked state of a vehicle, the parking brake applying braking force to a wheel of the vehicle when the vehicle is parked;
monitoring movement of the vehicle;
operating a main brake, which applies braking force to the wheel of the vehicle when the vehicle travels, when the vehicle is sensed to move above a predetermined reference value;
increasing locking force of the parking brake when the movement of the vehicle is stopped according to the operation of the main brake;
stopping the operation of the main brake;

after the increasing locking force of the parking brake, determining an inclination of the parked vehicle;

warning, when the inclination exceeds a predetermined reference value, a driver about the same; and receiving an instruction to stop the operation of the main brake from a driver or stopping the operation of the main brake after elapse of a predetermined reference time after the warning.

5. The brake control method according to claim 4, wherein the operating the main brake comprises controlling, by an active safety device, the main brake when the vehicle is sensed to move above the predetermined reference value.

6. The brake control method according to claim 4, wherein the increasing locking force of the parking brake is performed in a manner of increasing a value of current supplied to a brake motor provided in the parking brake.

7. The brake control method according to claim 4, wherein the monitoring movement of the vehicle determines the movement of the vehicle from a value sensed by a vehicle speed sensor installed to the vehicle.

8. The brake control method according to claim 4, wherein the monitoring movement of the vehicle determines the movement of the vehicle from a value sensed by a gyro sensor or an acceleration sensor.

9. The brake control method according to claim 4, wherein the parking brake and the main brake are integrally controlled by a parking brake controller.

10. A brake control method for parking, comprising:

identifying a locked state of a parking brake or a parked state of a vehicle;

monitoring movement of the vehicle;

operating a main brake when the vehicle is sensed to move above a predetermined reference value;

increasing locking force of the parking brake when the movement of the vehicle is stopped according to the operation of the main brake;

stopping the operation of the main brake;

after the increasing locking force of the parking brake;

determining an inclination of the parked vehicle;

warning, when the inclination exceeds a predetermined reference value, a driver about the same; and receiving an instruction to stop the operation of the main brake from a driver or stopping the operation of the main brake after elapse of a predetermined reference time after the warning.

11. The brake control method of claim 10, wherein the operating a main brake is performed through an active safety device for controlling the main brake.

12. The brake control method of claim 10, wherein the increasing locking force of the parking brake is performed in a manner of increasing a value of current supplied to a brake motor provided in the parking brake.

13. The brake control method of claim 10, wherein the monitoring movement of the vehicle determines the movement of the vehicle from a value sensed by a vehicle speed sensor installed to the vehicle.

14. The brake control method according to claim 10, wherein the monitoring movement of the vehicle determines the movement of the vehicle from a value sensed by a gyro sensor or an acceleration sensor.

15. The brake control method of claim 10, wherein the parking brake and the main brake are integrally controlled by a parking brake controller.

* * * * *